(12) United States Patent
Currie et al.

(10) Patent No.: US 7,785,061 B2
(45) Date of Patent: *Aug. 31, 2010

(54) APPARATUS AND METHOD FOR REORIENTING A TIRE AND CORE ASSEMBLY IN A TIRE MANUFACTURING LINE

(75) Inventors: William Dudley Currie, Stow, OH (US); Dennis Alan Lundell, Akron, OH (US); David Alan Henthorne, Copley, OH (US); Mary Beth Dombrosky, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/962,254

(22) Filed: Dec. 21, 2007

(65) Prior Publication Data

US 2009/0162180 A1    Jun. 25, 2009

(51) Int. Cl.
  *H01L 21/68* (2006.01)
  *B29D 30/24* (2006.01)
  *B25G 3/00* (2006.01)
(52) U.S. Cl. .................. 414/783; 294/97; 156/414; 403/334; 414/908; 414/910
(58) Field of Classification Search .......... 156/414, 156/417; 242/584.1, 599; 294/95–97; 403/324, 403/334, 361; 414/783, 908, 910–911; 425/35, 425/47, 577
See application file for complete search history.

(56) References Cited

U.S. PATENT DOCUMENTS

| | | | |
|---|---|---|---|
| 1,179,898 A | 4/1916 | Coffey et al. | |
| 1,388,255 A | 8/1921 | Hardeman | |
| 1,682,620 A | 8/1928 | Ledwinka | |
| 2,123,586 A | 7/1938 | Heston | 154/9 |
| 3,322,599 A * | 5/1967 | Bishop | 156/417 |
| 3,560,302 A | 2/1971 | Missioux | 156/515 |
| 3,607,558 A | 9/1971 | Nebout | 156/415 |
| 3,684,621 A | 8/1972 | Frazier et al. | 156/401 |

(Continued)

FOREIGN PATENT DOCUMENTS

DE    2002294    7/1971

(Continued)

OTHER PUBLICATIONS

European Search Report completed Mar. 26, 2009.

*Primary Examiner*—Gregory W Adams
(74) *Attorney, Agent, or Firm*—Richard B. O'Planick (57) ABSTRACT

Apparatus and method for reorienting a toroidally shaped core configured to carry a green tire. The core includes a central axis defined through first and second oppositely facing tapered recesses respectively including first and second locking mechanisms. The apparatus includes a core support structure including a base and a reorientation member connected for movement relative to said base and a core coupling member. The core coupling member connects for movement with the reorientation member and includes a core locking mechanism that couples with the core coupling member and locks the core coupling member to the core. A drive system couples with the reorientation member and operatively moves the reorientation member so as to change the orientation of the central axis from a first orientation to a second, different orientation transverse to the first orientation.

8 Claims, 8 Drawing Sheets

U.S. PATENT DOCUMENTS

| | | | | |
|---|---|---|---|---|
| 3,747,946 | A * | 7/1973 | Edens | 279/81 |
| 3,767,509 | A | 10/1973 | Gazuit | 146/415 |
| 3,817,812 | A * | 6/1974 | Yabe | 156/415 |
| 3,833,445 | A | 9/1974 | Mallory et al. | 156/401 |
| 3,868,203 | A | 2/1975 | Turk | 425/242 |
| 4,007,080 | A | 2/1977 | Klopper | 156/396 |
| 4,043,725 | A | 8/1977 | Schmidt | 425/542 |
| 4,045,277 | A | 8/1977 | Habert et al. | 156/417 |
| 4,083,672 | A | 4/1978 | Vaishnav | 425/457 |
| 4,211,592 | A | 7/1980 | Grawey | 156/123 |
| 4,728,274 | A | 3/1988 | Siegenthaler | 425/34 R |
| 4,877,468 | A | 10/1989 | Siegenthaler et al. | 156/111 |
| 4,895,692 | A | 1/1990 | Laurent et al. | 264/326 |
| 5,061,339 | A * | 10/1991 | Nakagaki | 156/446 |
| 5,201,975 | A | 4/1993 | Holroyd et al. | 156/124 |
| 5,384,084 | A | 1/1995 | Siegenthaler | 264/237 |
| 5,487,638 | A * | 1/1996 | Salsburg et al. | 414/796.9 |
| 5,622,669 | A | 4/1997 | Dailliez et al. | 264/403 |
| 5,719,331 | A * | 2/1998 | Delmoro | 73/146 |
| 5,853,526 | A | 12/1998 | Laurent et al. | 156/398 |
| 6,089,084 | A * | 7/2000 | Nishihara et al. | 73/146 |
| 6,203,641 | B1 | 3/2001 | Laurent et al. | 156/110.1 |
| 6,234,227 | B1 | 5/2001 | Bosseaux | 156/398 |
| 6,250,356 | B1 | 6/2001 | Cordaillat et al. | 156/400 |
| 6,318,432 | B1 | 11/2001 | Caretta et al. | 152/552 |
| 6,406,575 | B1 | 6/2002 | Baumgarten et al. | 156/96 |
| 7,621,308 | B2 * | 11/2009 | Lundell et al. | 156/417 |
| 2003/0157209 | A1 | 8/2003 | Scarzello et al. | 425/35 |
| 2005/0133149 | A1 | 6/2005 | Sieverding et al. | 156/130.5 |

FOREIGN PATENT DOCUMENTS

| | | |
|---|---|---|
| EP | 0 458 342 A1 | 7/1991 |
| EP | 0 893 237 A2 | 1/1999 |
| EP | 0 928 679 A2 | 7/1999 |
| EP | 1 090 729 | 4/2001 |
| EP | 1090729 A2 | 4/2001 |
| EP | 1792712 A1 | 6/2007 |
| GB | 167073 | 8/1921 |
| GB | 549905 | 12/1942 |
| GB | 1524369 | 9/1978 |
| JP | 07237269 | 9/1995 |
| JP | 11-291363 | 10/1999 |
| JP | 11-320567 | 11/1999 |
| JP | 2001-001342 | 1/2001 |
| JP | 2001-079850 | 3/2001 |
| JP | 2002-096403 | 4/2002 |
| RU | 1162615 | 10/1983 |
| WO | 82/00017 | 1/1982 |
| WO | 01/62481 | 5/2001 |
| WO | 02/45942 A1 | 6/2002 |
| WO | 03/103935 | 12/2003 |
| WO | 2005/009724 | 2/2005 |

* cited by examiner

APPARATUS AND METHOD FOR REORIENTING A TIRE AND CORE ASSEMBLY IN A TIRE MANUFACTURING LINE

FIELD OF THE INVENTION

The subject invention relates generally to automated tire manufacturing lines and more specifically to movement of a tire build core assembly within an integrated tire manufacturing system.

BACKGROUND OF THE INVENTION

Automation of a tire manufacturing line may include the use of a tire building core including latching and handling mechanisms such as disclosed in U.S. patent application Ser. No. 11/292,991 entitled "TIRE BUILDING CORE LATCHING AND TRANSPORT MECHANISM", filed Dec. 2, 2005 and U.S. patent application Ser. No. 11/293,397 entitled "HEATED TIRE BUILDING CORE ASSEMBLY AND METHOD", filed Dec. 2, 2005. A green tire is constructed on a toroidal surface of the tire building core and the core and tire assembly is transported to a tire cure station as a unit. It is desirable to transport the core and tire assembly from a tire build station to a tire cure station in an efficient and cost-effective manner that minimizes manufacturing costs and cycle times.

SUMMARY OF THE INVENTION

An aspect of the invention is an apparatus for reorienting a toroidally shaped core configured to carry a green tire. The core includes a central axis defined through first and second oppositely facing tapered recesses respectively including first and second locking mechanisms. The apparatus includes a core support structure including a base and a reorientation member connected for movement relative to said base and a core coupling member. The core coupling member connects for movement with the reorientation member and is constructed having a tapered outer structure generally complementary to the respective first and second oppositely facing tapered recesses of the core for alternatively mating therewith. A core locking mechanism couples with the core coupling member and is configured to lock alternatively with the first and second locking mechanisms of the core when the tapered outer structure is received in the first or second tapered recesses of the core. A drive system couples with the reorientation member and operatively moves the reorientation member so as to change the orientation of the central axis from a first orientation to a second, different orientation transverse to the first orientation.

According to another aspect of the invention, a method for reorienting a toroidally shaped core configured to carry a green tire is provided. The method includes inserting a tapered outer structure of a core coupling member to one of a first or a second oppositely facing tapered recesses of the core with the central axis of the core in a first orientation; locking the core coupling member with the corresponding one of the first or second locking mechanisms of the core; and reorienting the core coupling member so as to change the orientation of the central axis from the first orientation to a second, different orientation transverse to the first orientation.

BRIEF DESCRIPTION OF THE DRAWINGS

The invention will be described by way of example and with reference to the accompanying drawings in which.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane "Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

DETAILED DESCRIPTION OF THE INVENTION

Figure 1:
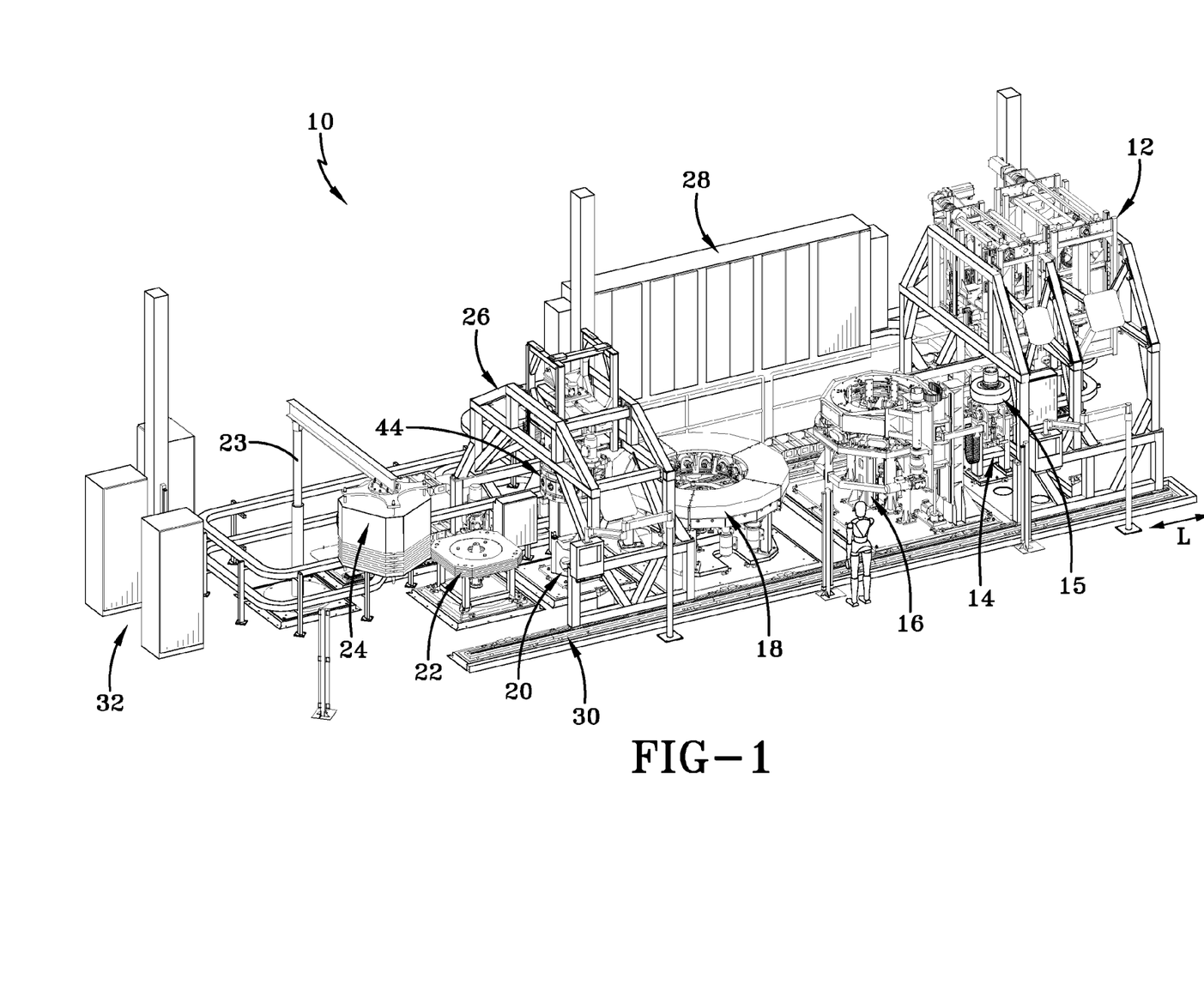
FIG. 1 is a top front perspective view of a tire curing line assembly.
Figure 2:
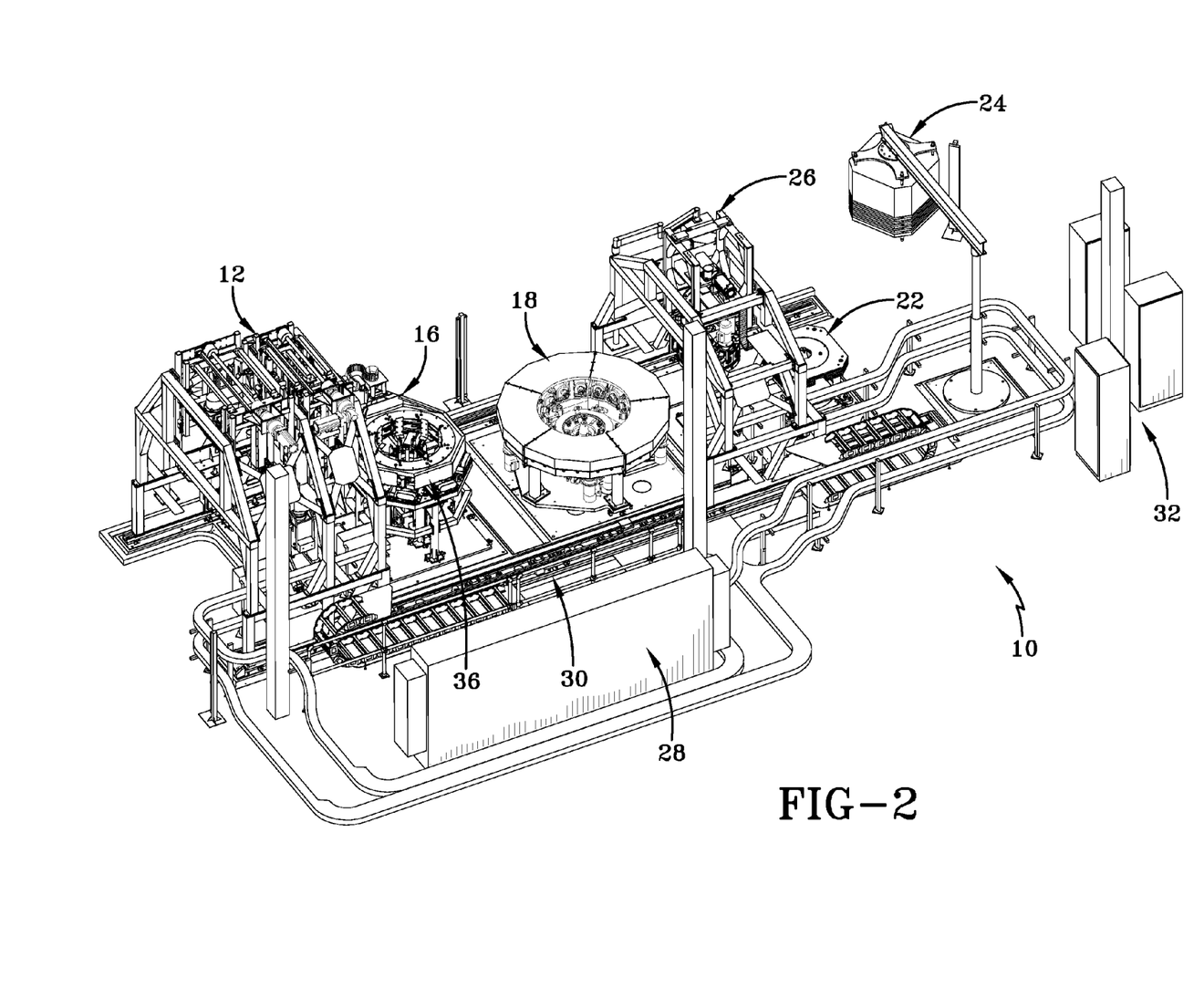
FIG. 2 is a top rear perspective view of the tire curing line assembly.

Referring initially to FIGS. 1 and 2, a curing line 10 is shown as part of an integrated tire manufacturing line. The curing line 10 includes a plurality of stations arranged in a linear array, however, other arrangements of the work stations may be utilized if desired to accommodate facility and production demands. The tire manufacturing line builds a tire from components applied to a segmented core dimensioned and configured close to the finished tire.

A tire building core assembly of the type and configuration disclosed in U.S. patent application Ser. No. 11/292,991 entitled "TIRE BUILDING CORE LATCHING AND TRANSPORT MECHANISM", filed Dec. 2, 2005 and U.S. patent application Ser. No. 11/293,397 entitled "HEATED TIRE BUILDING CORE ASSEMBLY AND METHOD", filed Dec. 2, 2005, likewise incorporated herein by reference. The construction of the core provides a positive mechanism for engaging and transporting the tire building core between a number of stations within an automated tire manufacturing line. Attachment points are located in each end of a spindle assembly of the core. The mechanism allows for automated attachment/detachment of a transport mechanism to the tire building core and facilitates a movement of the tire building core and green tire constructed thereon.

The tire building core is formed by multiple core segments each having an outer surface portion which together define a toroidal outer surface. The core includes first and second spindle assemblies placed on opposite sides of the multiple core segments along a central core axis. For tire build operation, the core central axis is oriented horizontally and the toroidal outer surface defined by the core segments is rotated about the horizontal core central axis. As the toroidal surface rotates, a green tire is constructed layer by layer to the surface until a green tire is completely constructed on the core. The core and green tire assembly is thereafter transported still in the horizontal central axis orientation by suitable means to a curing line 10 that includes multiple curing line stations oriented along a linear path identified as "L" in FIG. 1. More specifically, the core and green tire assembly is presented to an upender apparatus situated in the curing line 10 as will be explained.

The curing line 10 is intended to be integrated into the tire manufacturing line described above and includes an upper core manipulator 12, upender apparatus 14, and a lower core manipulator 16 that operatively engage a tire building core and green tire assembly 15. The upper core assembly 12 generally moves the core assembly 15 in a core axis-vertical orientation along the curing line 10 between a mold assembly station 18, a mold storage stand 20, and a cure station 22 having an induction heat dome assembly 24 positioned adjacent thereto. A mold manipulator transport assembly 26 bridges over the curing line and moves under electrical control from control panel 28 along a transport rail assembly 30. Induction heating control panels 32 are positioned adjacent the induction dome assembly 24 and electrically control the induction heating assembly 24 throughout each heating and cure cycle.

Figure 3:
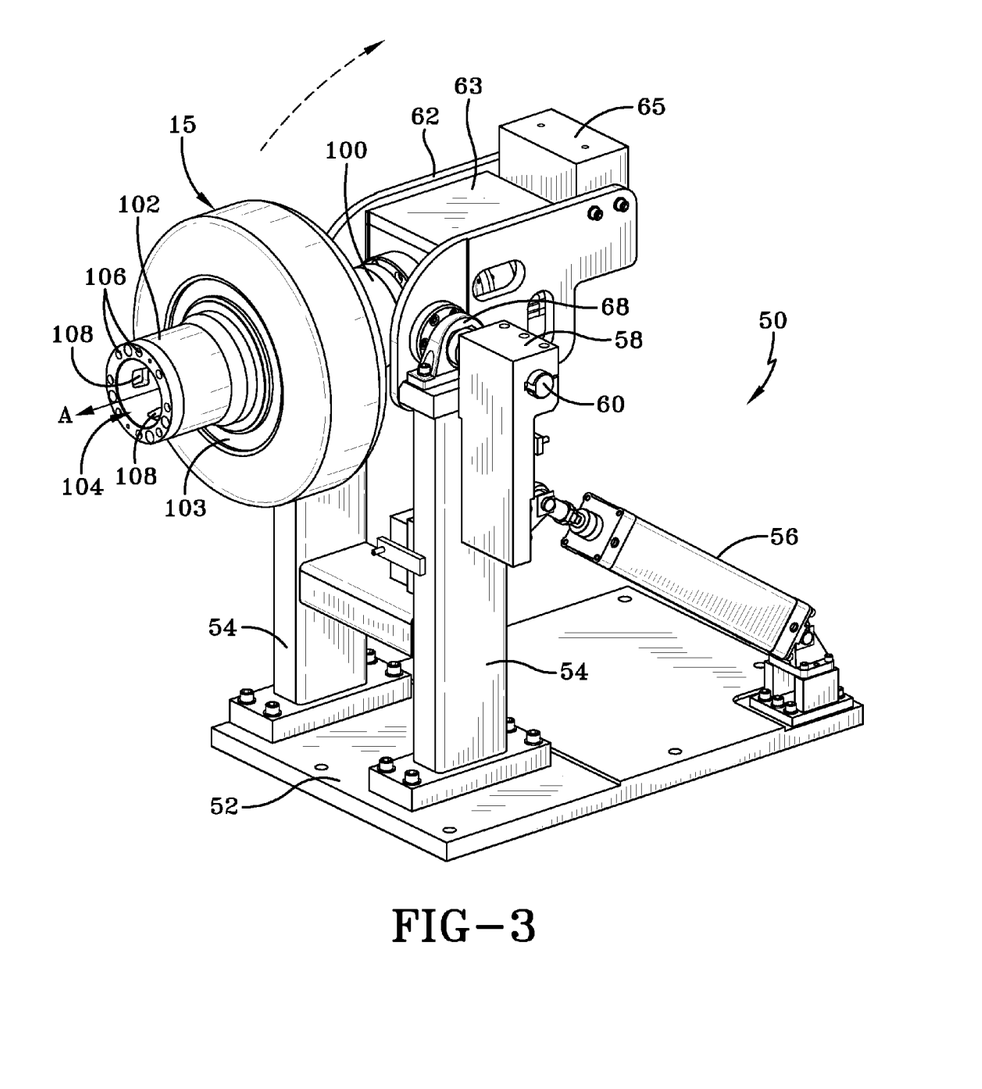
FIG. 3 a top perspective view of the core upender assembly shown in the down or axis-horizontal position coupled to a tire building core assembly.
Figure 4:
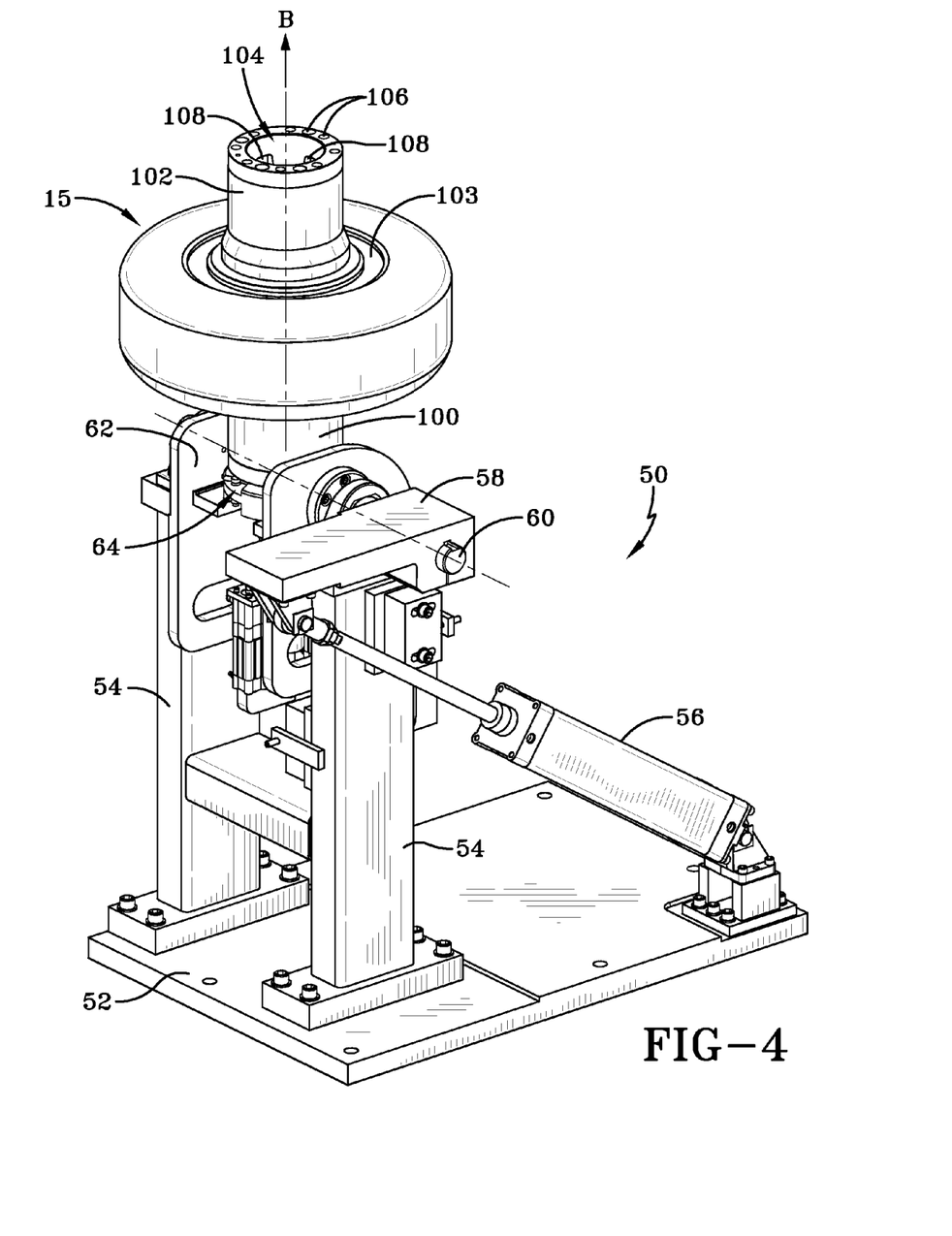
FIG. 4 is a top perspective view of the core upender assembly shown in the up or axis-vertical position.
Figures 5, 5A:
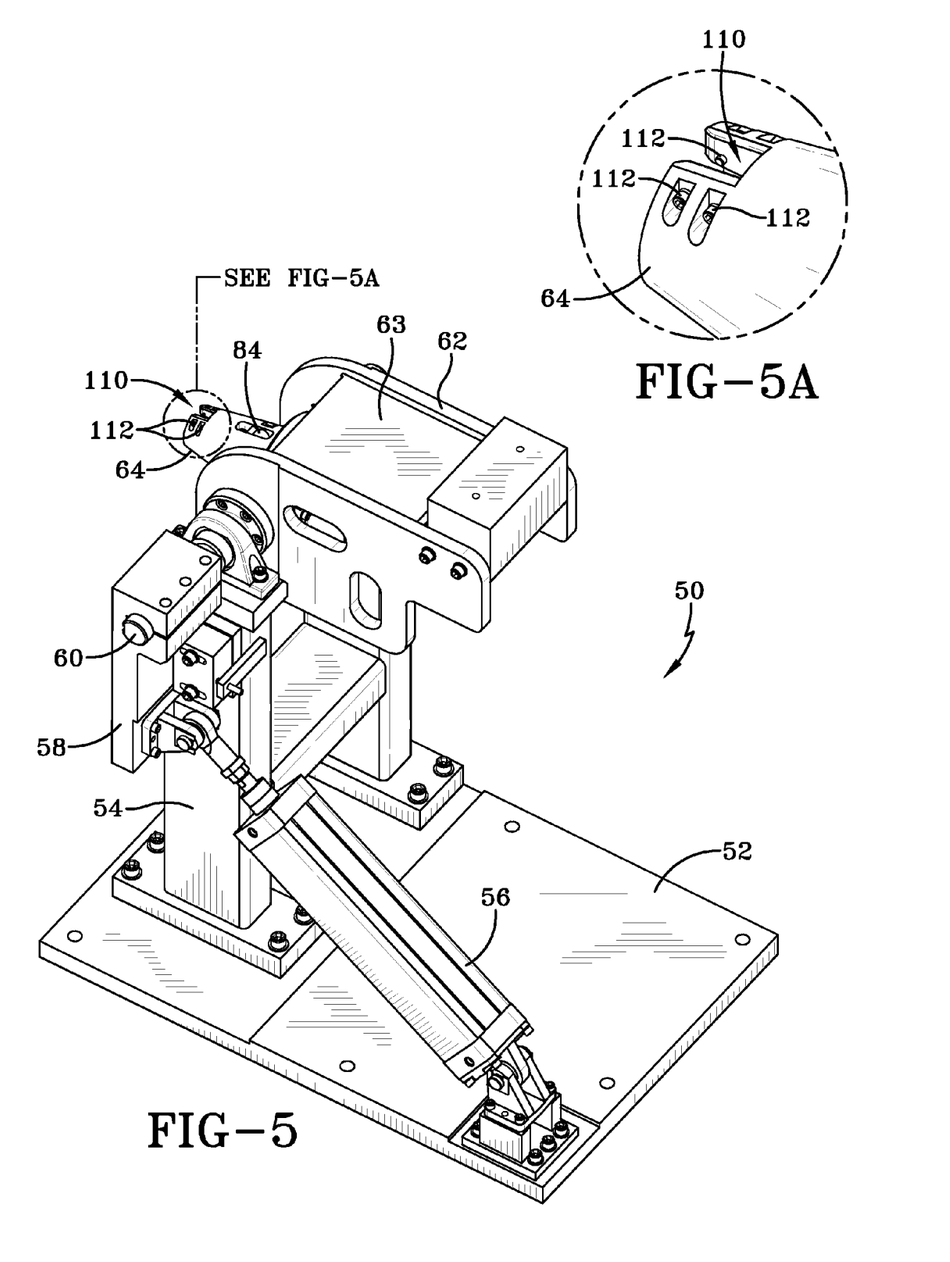
FIG. 5 is a top perspective view of the core upender assembly in the down position and shown without the tire building core assembly.
FIG. 5A is an enlarged perspective view of the coupling nose portion of FIG. 5.
Figure 6:
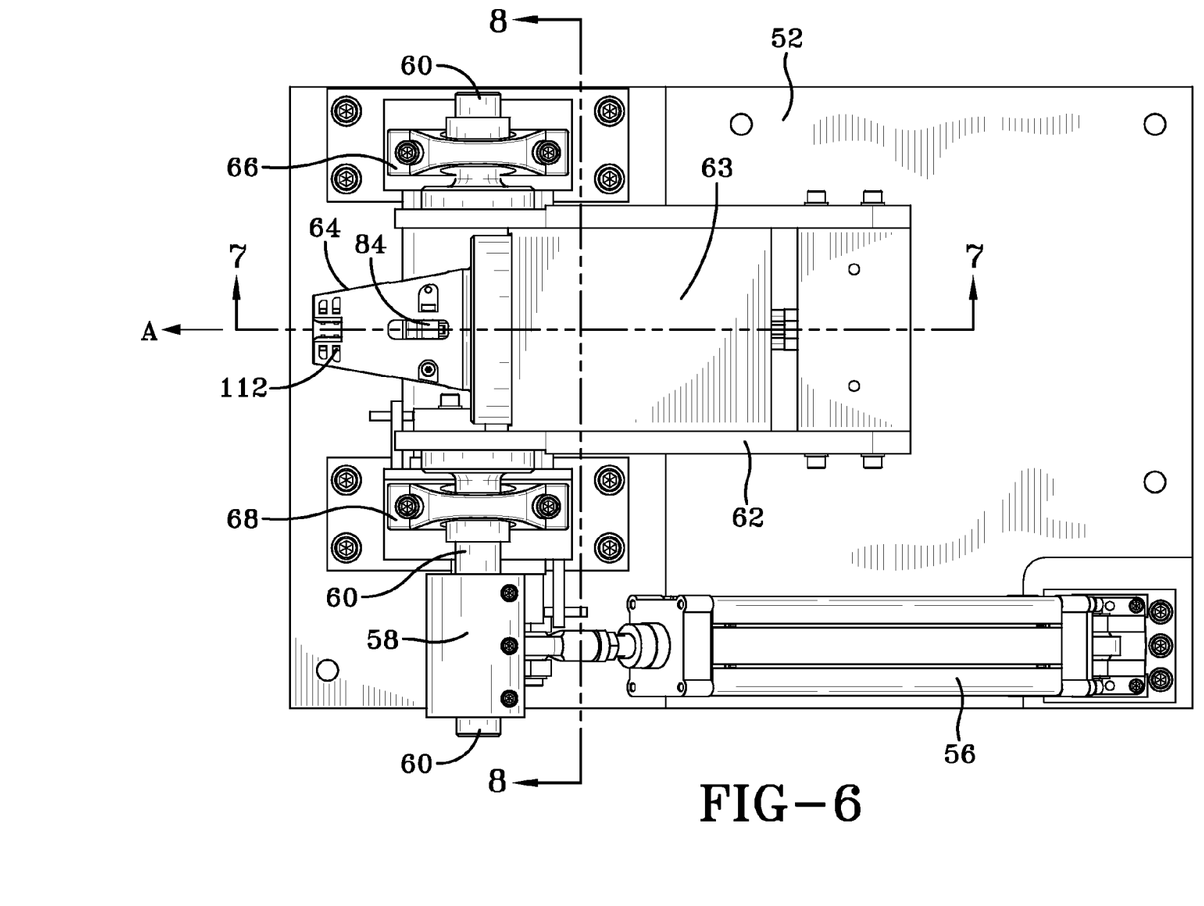
FIG. 6 is a top plan view of the core upender assembly in the down position.

Referring to FIGS. 3, 4, and 5, upender apparatus 50 represents a core support structure for reorienting a toroidally shaped core assembly 15. The core assembly 15 has a central axis identified as "A" in FIG. 1. The apparatus 50 includes a base 52, and a lower support frame 54. A block member 58 is coupled to a transverse pivot shaft 60 and to a drive system represented by pneumatic cylinder 56. Actuation of the cylinder 56 moves block 58 which in turn rotates the shaft 60. An upper support frame 62 is provided and is likewise coupled to the pivot shaft 60 such that a rotation of the shaft 50 causes the frame 62 to pivot in the direction of the arcuate arrow shown in FIG. 3.

Frame 62 supports reorientation housing 63. Housing 63 rotates with the frame 62 driven by cylinder 56. Extending forward from the housing 63 is a core coupling member 64. The member 64 is connected for pivotal movement with the housing 63 and frame 62 relative to the base 52. The core coupling member 64 is configured as a frustro-conical body having a tapered outer structure 70. The housing 63 pivots upward until engaged by a vertical stop block 65. 65 is a counterbalance weight. The upward rotation of the frame 62 is limited by the stop block visible on the inside leg of 54. It contacts the notch in 62.

Figure 7:
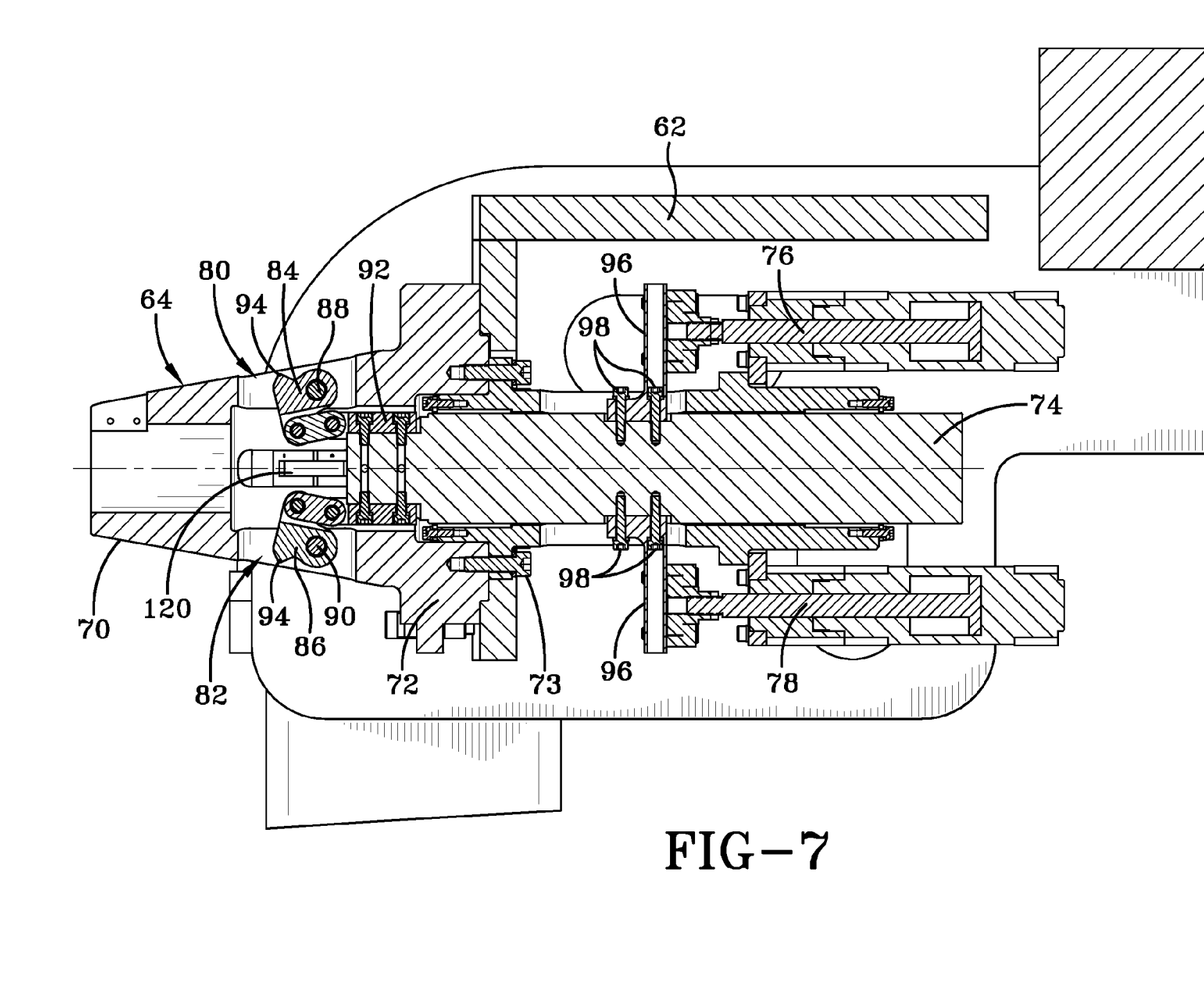
FIG. 7 is a longitudinal sectional view of the upender assembly taken along the line 7-7 of FIG. 6.

A pair of brackets (pillow block ball bearings) 66, 68 secure the pivot shaft into position on top of the support frame 54. As best seen in FIGS. 4-7, an annular flange 72 abuts the forward end of housing 62 and attaches to the housing 62 by means of bolts 73. An elongate actuation rod 74 is positioned within the housing 62. A pair of pneumatic actuation cylinders 76, 78 is mounted to drive the rod 74 reciprocally in an axial direction. The coupling member 64 has a pair of openings 80, 82 extending therethrough. Mounted within each opening is a pivotally mounted latch member 84, 86, respectively. The members 84, 86 are pivotally mounted to a collar member 92 by respective pivot pins 88, 90. Collar member 92 seats within an annular forward recess of the pivot pin 74. An annular flange 96 is provided as seen in FIG. 7 affixed to the rod 74 by pins 98. The piston of each pneumatic cylinder 76, 78 attaches to each flange 96 and axial movement of the piston moves the rod 74 axially forward and backward. Forward movement of the rod 74 operates to rotate the latches 84, 86 so that remote latching flanges 94 project out of their respective openings 80, 82. An axial retraction of the rod 74 causes a reverse rotation of the latches 84, 86, moving the flanges 94 thereof back into their respective openings 80, 82.

The core coupling member 64 is generally of frustro-conical shape having a tapered outer surface 70. The member 64 is coupled to the housing 62 for reciprocal reorientation movement with the housing 62, driven by cylinder 56 through shaft 60. A core and green tire assembly 15, as shown in FIGS. 3 and 4, includes a spindle assembly 100, 102 extending axially from opposite sides of a core toroidal surface 103. Extending axially into an end of each spindle assembly 100, 102 is an axial recess 104 having a tapered inner structure complementary to the tapered outer surfaces of the nose 70 of the coupling member 64. Surrounding the open end of the recesses 104 are electrical connector sockets 106. Within the sidewall defining each recess 104 are a pair of through-openings 108.

Figure 8:
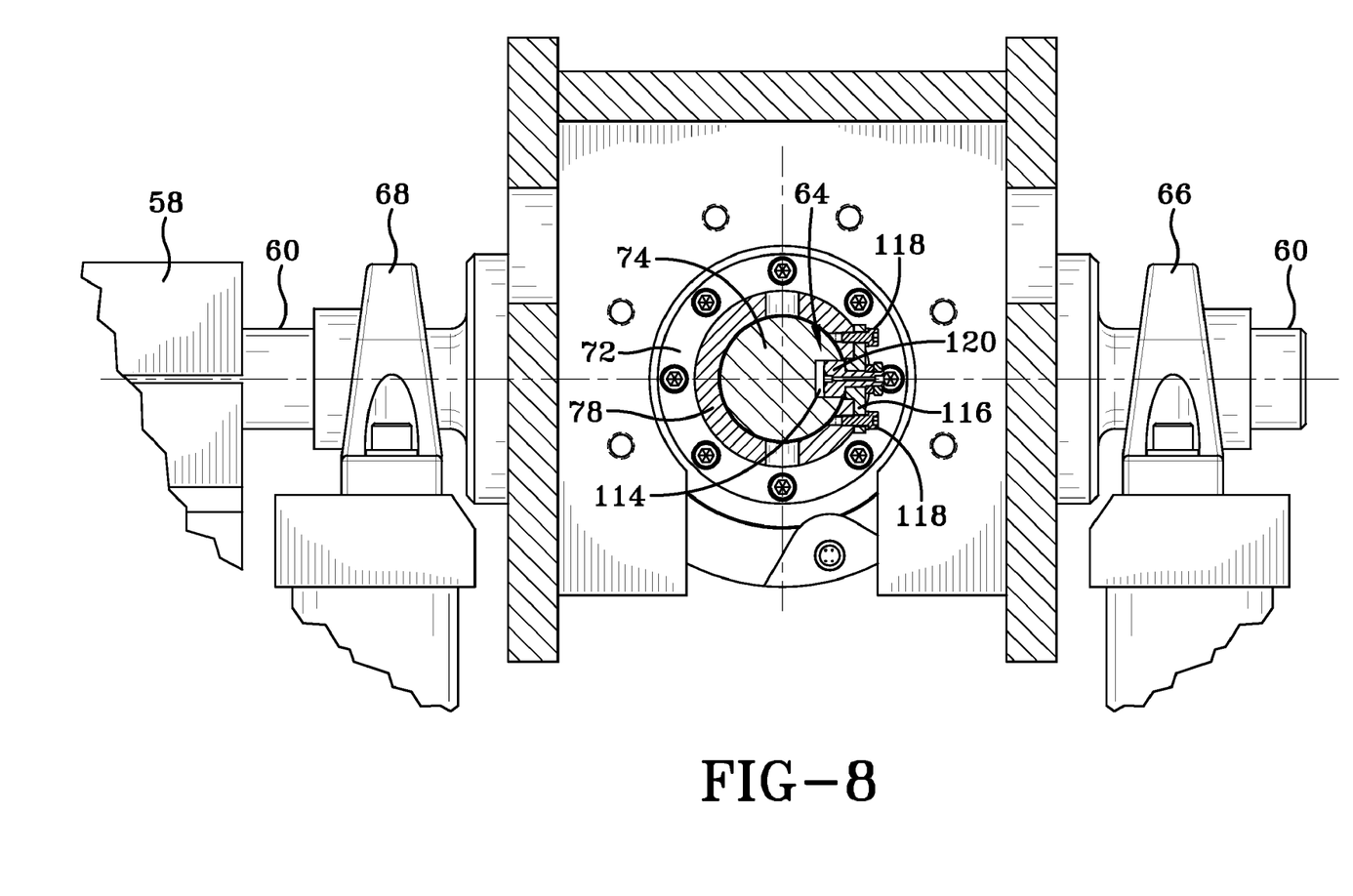
FIG. 8 is a front plan view of the upender assembly.

The core assembly 15 is brought into a coupled engagement with the assembly 50 as the nose 70 of the coupling member 64 inserts into the tapered recess 104 of an alternative one of the spindle assemblies 100, 102. The nose 70 has a notch 110 along a side. Projecting inward from the notch 110 are four pins 112. The notch in 70 has wear plates on either side located where the 110 is pointing. Items 112 are screws holding the wear plates in place. The notch and wear plates form a pocket that engages a corresponding key in the core when it is engaged. This orients the core rotation angle. The same arrangement is used in both ends of the core and all the attachment points to maintain core rotation angle. Upon coupled engagement between the nose 70 and spindle recess 104 of an alternative one of the spindle assemblies, 100, 102, the latch members 84, 86 are pivoted outward by a forward axial movement of rod 74 and the latching flanges 94 of the latch members 84, 86 each enter into a respective opening 108 in the spindle assembly recess 104. A core locking engagement between the nose 70 and the spindle assembly 100 results. From FIG. 8, it will be seen that the actuation rod 74 moves within the nose 70 of the coupling member 54. A guide member 116 attaches to a forward end of the nose 70 by means of two pins (screws) 118. A guide flange (needle bearing cam follower) 120 projects from the guide member 116 into a slot 114 formed within the rod 74 to align the rod 74 within the nose 70.

It will be appreciated that the subject apparatus 50 functions to reorient the toroidally shaped core assembly 15 carrying a green tire from a first orientation into a changed reorientation. The core assembly 15 is moved from a tire construction station in an initial orientation as shown in FIG. 3 wherein an axis of the assembly 15 is generally horizontal, represented by axis "A". Thereafter, the core coupling member 64 is brought into an engagement with the spindle assembly 100 of the assembly 15 as the tapered outer surfaces of the nose 70 insert into the complementarily tapered recess 104 of one of the spindle assemblies 100, 102. Each spindle assembly 100, 102 is provided with a mating recess 104 so either may be coupled to the coupling member 64 of apparatus 50. The core locking mechanism represented by latches 84, 86 are coupled to the core coupling member 64 and operatively lock alternatively with either spindle assembly 100, 102. Either end of the core could be latched to the upender, but the power connector end is typically used as the latch end. That way the core is oriented properly for plugging in power as it goes through a cure line (not shown). Pending U.S. patent application Ser. No. 11/292,991, incorporated herein by reference, shows and describes the core assembly and locking mechanism.

As seen from FIG. 4, the drive cylinder 56 is then actuated to reorient the upper frame 62 and the coupling member 64 connected thereto into a reorientation in which the axis "B" of the core assembly 15 is changed. In the orientation shown, axis "B" is generally vertical. It will be noted that the coupling apparatus 64 engages spindle assembly 100, leaving like-configured spindle assembly 102 and its recess 104 accessible for core pick up by a transport device having a coupling structure duplicating the coupling apparatus 64. The core assembly is thus reoriented from the orientation (FIG. 3) in which it is transported from a tire build station into a reorientation (FIG. 4) by the apparatus 50. Engagement between a transport coupling apparatus (not shown) similar to coupling apparatus 64 to spindle assembly 102 may be effected while spindle assembly 100 remains latched to the coupling apparatus 64. Loss of control over the core and spindle assembly 15 is thus avoided during transfer. After a secure attachment between spindle assembly 102 and the transport apparatus is effected, the latched coupling between the coupling apparatus 64 with the locking openings 108 within spindle assembly 100 may be disengaged by reverse axial movement of the rod 74. Rearward movement of the rod 74 pivots latches 84, 86 out of the openings 108 in assembly 100, thereby allowing an axial withdraw of the core and green tire assembly 15 from the apparatus 50.

From the forgoing, it will be noted that the apparatus reorients 50 the central axis of the core and green tire assembly 15 from a first to a second, different orientation. The second orientation of the central axis is generally transverse to the first orientation. As shown, but not limited thereto, the second orientation of the central core assembly axis is vertical and the first orientation is horizontal. The apparatus 50 may reorient the core assembly 15 in an opposite direction if desired, that is, from a vertical central axis orientation to a horizontal axis orientation. Moreover, the apparatus 50 maintains a locked coupling with the assembly 15 throughout the reorientation. In addition, the apparatus 50 can couple alternatively to either end of the core assembly 15, leaving the opposite end exposed to facilitate a subsequent coupling to secondary like-configured coupling apparatus. Lastly, it will be recognized that the apparatus 50 can maintain a locked coupling with a first end of the core and green tire assembly 15 until the opposite end of assembly 15 is fully secured to any like-configured secondary coupling apparatus. After the opposite end of assembly 15 is secured, the locked coupling with the first end of the core and green tire assembly to apparatus 50 may be released.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Apparatus for reorienting a toroidally shaped core configured to carry a green tire, the apparatus comprising:

first and second oppositely facing tapered recesses within opposite ends of the core along a major axis and respectively including within each tapered recess first and second locking mechanisms, a core support structure including a base and a reorientation member connected for movement relative to said base;

a core coupling member connected for movement with said reorientation member, said core coupling member comprising a tapered outer structure complementary to the respective first and second oppositely facing tapered recesses of the core for alternatively mating to the tapered core recesses at either of the core opposite ends;

a core locking mechanism coupled with said core coupling member and configured to lock alternatively with the first and second locking mechanisms of either of the core first and second recesses at the core opposite ends when said tapered outer structure is received in a selected one of the first or second tapered recesses of the core; and a drive system coupled with said reorientation member and operative to move said reorientation member so as to change the orientation of the core major axis from a first orientation to a second, different orientation transverse to the first orientation, wherein in the second orientation an uncoupled one of the first and second core recesses opposite to the selected core recess is operatively exposed for coupling with a secondary like-configured coupling member.

2. The apparatus of claim 1, the reorientation member pivots relative to the base to change the orientation of the central axis from the first to the second orientation.

3. The apparatus of claim 1, wherein the core coupling member includes a frustro-conical nose structure that complements first and second frustro-conical recesses of the core.

4. The apparatus of claim 1, wherein the core locking mechanism of the core coupling member maintains a lock with a first locking mechanism of the core as the reorientation member changes the orientation of the central axis from the first orientation to a second, different orientation transverse to the first orientation.

5. The apparatus of claim 4, wherein a second locking mechanism of the core is located in an exposed position opposite the first locking mechanism of the core as the reorientation member changes the orientation of the core central axis from the first orientation to the second orientation.

6. Apparatus for reorienting a toroidally shaped core configured to carry a green tire, the apparatus comprising:

at least a first tapered recess within a first end of the core along a major core axis and including a first locking mechanism within the tapered recess;

a core support structure including a base and a reorientation member connected for movement relative to said base;

a core coupling member connected for movement with said reorientation member, said core coupling member comprising a tapered outer structure complementary to the first tapered recess of the core for mating therewith;

a core locking mechanism coupled with said core coupling member and configured to lock with the first locking mechanism within the core recess when said tapered outer structure is received in the first tapered recess of the core; and a drive system coupled with said reorientation member and operative to move said reorientation member so as to change the orientation of the core major axis from a first orientation to a second, different orientation transverse to the first orientation.

7. The apparatus of claim 6, wherein the first orientation of the central axis is substantially horizontal and the second orientation is substantially vertical.

8. A method for reorienting a toroidally shaped core configured to carry a green tire, the method comprising:

deploying first and second oppositely facing tapered recesses respectively within opposite ends of the core along a major core axis, the tapered recesses respectively including first and second locking mechanisms therein;

inserting a tapered outer structure of a core coupling member into a selected one of either the first or second oppositely facing tapered recesses of the core with the central axis of the core in a first orientation;

locking the core coupling member with the corresponding one of the first or second locking mechanisms within the core recesses; and reorienting the core coupling member so as to change the orientation of the core major axis from a first orientation to a second, different orientation transverse to the first orientation, and wherein in the second orientation an uncoupled one of the first and second core recesses opposite to the selected core recess is operatively exposed for coupling with a secondary like-configured coupling member.

* * * * *